UNITED STATES PATENT OFFICE.

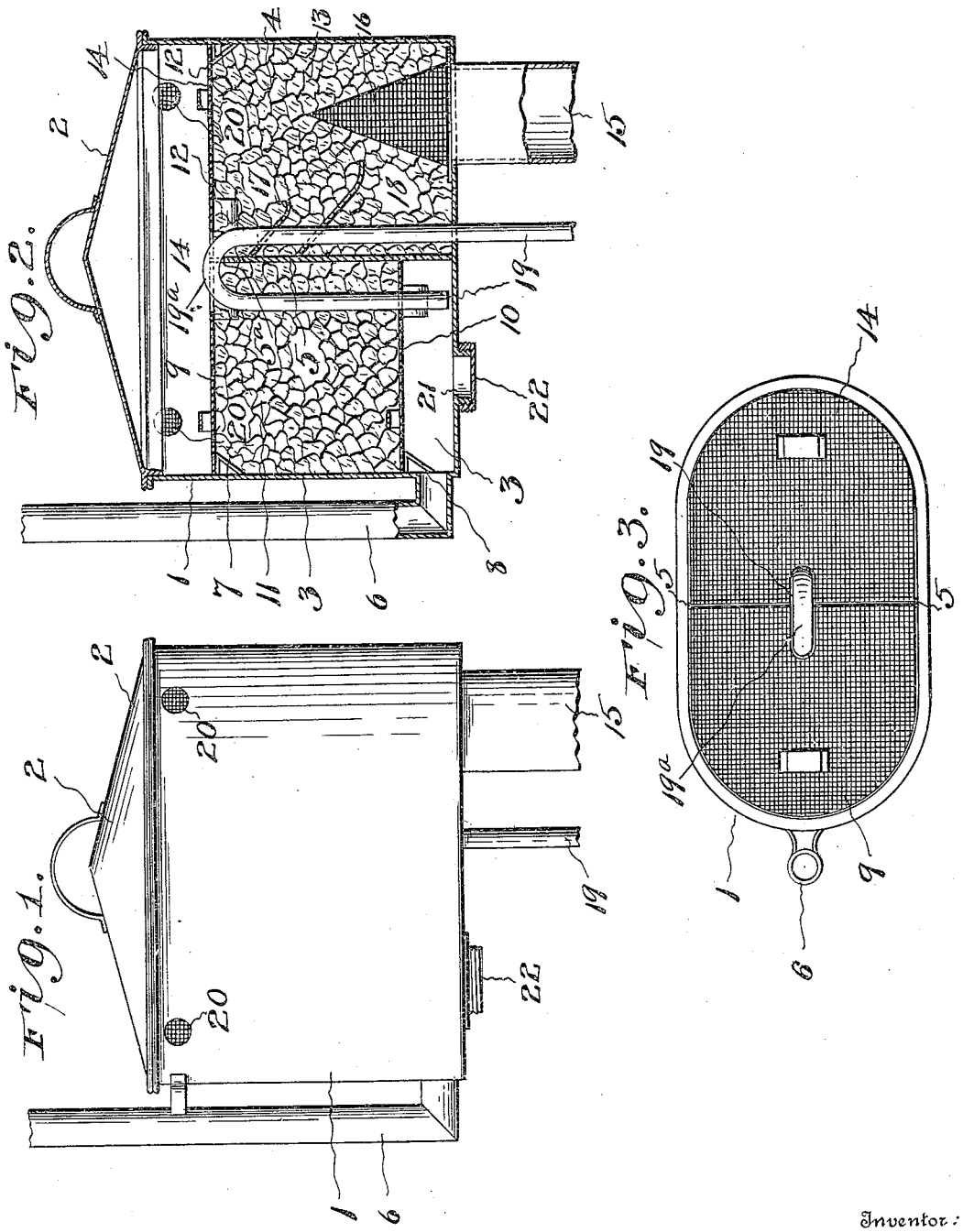

GEORGE VOL. SPONENBARGER, OF BLACKWELL, OKLAHOMA.

FILTER.

945,989.   Specification of Letters Patent.   Patented Jan. 11, 1910.

Application filed February 24, 1909. Serial No. 479,707.

*To all whom it may concern:*

Be it known that I, GEORGE VOL. SPONENBARGER, a citizen of the United States, and a resident of Blackwell, in the county of Kay and State of Oklahoma, have invented certain new and useful Improvements in Filters, of which the following is a specification.

My invention relates to filters used to cleanse rain water before entering cisterns, and has for its object the provision of a filter provided with a siphon that automatically empties after the flow of water ceases, that will thoroughly cleanse the water of birds' nests and other impurities, that can be easily cleaned, that will not freeze because of the siphon that empties it after the flow of water ceases, and that is thoroughly ventilated so that the charcoal used in the filter beds is kept dry and sweet when the weather is dry.

The construction and operation of my improved filter will be described in detail hereinafter, and illustrated in the accompanying drawings, in which—

Figure 1 is a side view in elevation of my improved filter; Fig. 2, a vertical longitudinal sectional view; and Fig. 3, a plan view with the top removed.

In the drawings similar reference characters indicate corresponding parts in all of the views.

The casing 1 of my improved filter is open at the top and has a removable and replaceable top or cover 2 therefor. The interior of casing 1 is divided into two compartments 3 and 4 by means of a partition 5 that ends below the top.

Compartment 3 is the receiving compartment of the device and has pipe 6 connected with its lower end, said pipe being connected with the drain-spouts of the roof from which the water is to be drawn, said roof and drain-spouts not being shown. The interior of compartment 3 is provided with two sets of brackets 7 and 8, one set 7 adjacent to the top of the partition 5 and the other set 8 above the inlet of pipe 6.

9 and 10 indicate perforated plates, seated on brackets 7 and 8, respectively, and 11 a bed of charcoal or other filtering material contained between said plates.

12 indicates brackets on the inner walls of chamber 4, adjacent to the upper edge of partition 5, and 13 a bed of charcoal or other filtering material contained in compartment 4 and covered by perforated plate 14, supported by brackets 12.

15 indicates a pipe connecting the bottom of compartment 4 and emptying into the cistern (not shown), and 16 a cone-shaped screen over the mouth of pipe 15 and extending into the bed of filtering material 13.

17 and 18 indicate deflector plates secured to the partition 5 and extending into the bed of filtering material 13 to prevent the water passing through the filter from following down the surface of the partition and to compel it to flow through the center of the filter-bed 13.

19 indicates a pipe beginning near the bottom of compartment 3, extending up through said compartment, then bent over a notch 5ª in the top of the partition 5, as shown at 19ª, and extended down through compartment 4 and through the bottom of the casing. This pipe 19 acts as a siphon, when the filter is in operation, to drain the compartment 3 of water when the rain ceases, so that the filtering-bed 11 may dry, 20 indicating ventilating-openings near the top of casing 1, that act in conjunction with pipes 6, 15, and 19 to thoroughly aerate the filter-beds 11 and 13.

21 indicates a clean-out opening in the bottom of compartment 3, closed by cap 22, said opening being used to clean the space below plate 10 whenever it is desired so to do.

In operation the water enters the filter through pipe 6 into the space in compartment 3, below perforated plate 10, where all large pieces of impurities, such as sticks, birds' nests, and the like are caught and retained. The water then rises through plate 10, filter-bed 11, and plate 9 until it reaches the top of partition 5. It then overflows partition 5 and passes down through plate 14 and filtering-bed 13 and screen 16 into pipe 15, through which it passes to the cistern. At the same time a part of the water flows through pipe 19 and out of the filter, the bent portion, by being seated in notch 5ª, being below the top of the partition, so that when the flow of water in the pipe ceases the pipe 19 operates as a siphon, as hereinbefore stated, to drain compartment 3 of the water contained therein and in pipe 6.

Having thus described my invention, what I claim as new is—

In a filter, a casing, a partition dividing the casing into two compartments containing a filtering agent, a pipe for conveying water to the bottom of one compartment, a pipe for carrying the filtered water from the other compartment, and a siphon having one end adjacent to the bottom of the first-mentioned compartment and discharging outside of the delivery-pipe and the filter to carry off as waste the water remaining in the receiving-compartment when the flow through the delivery-pipe ceases, substantially as shown and described.

In witness whereof, I have hereunto set my hand in presence of two subscribing witnessses.

GEORGE VOL. SPONENBARGER.

Witnesses:
 D. S. ROSE,
 GEO. N. DANCE.